United States Patent
Pardo-Blazquez et al.

(10) Patent No.: US 9,106,541 B2
(45) Date of Patent: Aug. 11, 2015

(54) TOKEN-BASED CORRELATION OF CONTROL SESSIONS FOR POLICY AND CHARGING CONTROL OF A DATA SESSION THROUGH A NAT

(75) Inventors: Avelina Pardo-Blazquez, Madrid (ES); Susana Fernandez Alonso, Madrid (ES); Belen Pancorbo Marcos, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 860 days.

(21) Appl. No.: 13/133,568

(22) PCT Filed: Dec. 10, 2008

(86) PCT No.: PCT/EP2008/067262
§ 371 (c)(1),
(2), (4) Date: May 7, 2012

(87) PCT Pub. No.: WO2010/066295
PCT Pub. Date: Jun. 17, 2010

(65) Prior Publication Data
US 2012/0243547 A1    Sep. 27, 2012

(51) Int. Cl.
| H04L 12/26 | (2006.01) |
| H04L 12/721 | (2013.01) |
| H04L 12/841 | (2013.01) |
| H04L 12/24 | (2006.01) |
| H04L 12/14 | (2006.01) |
| H04L 29/12 | (2006.01) |
| H04L 29/06 | (2006.01) |

(52) U.S. Cl.
CPC .......... *H04L 41/0893* (2013.01); *H04L 12/14* (2013.01); *H04L 12/1428* (2013.01); *H04L 29/12386* (2013.01); *H04L 61/2521* (2013.01); *H04L 63/0245* (2013.01); *H04L 65/1016* (2013.01)

(58) Field of Classification Search
None
See application file for complete search history.

(56) References Cited

U.S. PATENT DOCUMENTS
6,621,793 B2    9/2003    Widegren et al.

FOREIGN PATENT DOCUMENTS
| JP | 2002-215481 A | 8/2002 |
| JP | 2006-005754 A | 1/2006 |
| WO | WO 02/37670 A2 | 5/2002 |

OTHER PUBLICATIONS

3GPP TS 23.203 V7.5.0 (Dec. 2007); 3rd Generation Partnership Project; Technical Specification Group Services and System Aspects; Policy and charging control architecture (Release 7); Valbonne, France.

(Continued)

*Primary Examiner* — Omar Ghowrwal

(57) ABSTRACT

A method of handling packets sent across a packet switched network comprising a policy server acting as a policy and charging rules function. The method comprises providing a first set of policy rules at said policy server, and installing these from the policy server into an access gateway over a first service control session. These policy rules cause packets belonging to a given IP session to be diverted by the access gateway to a network address translator. At the network address translator, an IP source address of said packets is translated into a translated IP source address identifying a deep packet inspection node. The network address translator forwards the packets to the deep packet inspection node configured to perform deep packet inspection of IP packets.

16 Claims, 14 Drawing Sheets

(56) References Cited

OTHER PUBLICATIONS

3GPP2 X.S0013-012-0 Version 1.0, 3rd Generation Partnership Project 2, All-IP Core Network Multimedia Domain, Service Based Bearer Control—Stage 2, Dec. 2007.

ETSI ES 283 034 V1.1.1 (Jun. 2006) Telecommunications and Internet Converged Services and Protocols for Advanced Networks (TISPAN); Network Attachment Sub-System (NASS); e4 interface based on the Diameter protocol; Sophia Antipolis Cedex, France.

"Examples of Network Address Translation NAT and Firewall Traversal for the Session Initiation Protocol," Dec. 4, 2003.

"Digital cellular telecommunications system (Phase 2+); Universal mobile Telecommunications System (UMTS): Policy and charging control architecture (3GPP TS 23.203 version 7.8.0 Release 7); ETSI TS 123 203" ETSI Standard [Online] vol. 23. No. 203 Sep. 2005.

Rigney, et al.; Network Working Group; Request for Comments: 2865; Obsoletes: 2138; Category: Standards Track; Remote Authentication Dial in User Service (RADIUS); Jun. 2000.

Calhoun, et al., Network Working Group; Request for Comments: 3588; Category: Standards Track; Diameter Base Protocol; Sep. 2003.

Handley, et al., Network Working Group; Request for Comments: 4566; Obsoletes: 2327, 3266; Category: Standards Track; SDP: Session Description Protocol; Jul. 2006.

TOKEN-BASED CORRELATION OF CONTROL SESSIONS FOR POLICY AND CHARGING CONTROL OF A DATA SESSION THROUGH A NAT

TECHNICAL FIELD

The present invention relates to Policy and Charging Control in a telecommunications system. It relates in particular to a method and apparatus for implementing Policy and Charging Control in an architecture employing Network Address Translators to facilitate so-called Deep Packet Inspection.

BACKGROUND

Modern telecommunication systems may incorporate Policy and Charging Control (PCC) architectures. A PCC architecture is described in 3GPP TS 23.203 in respect of packet flows in an IP-CAN session established by a user equipment UE through a 3G telecommunications system. The particular architecture comprises: a Policy and Charging Rules Function (PCRF) and a Policy and Charging Enforcement Function (PCEF). The PCRF behaves as a Policy Decision Point (PDP) or Policy Server (PS), and the PCEF behaves as a Policy Enforcing Point (PEP). Whilst the PCRF can be implemented as a standalone node, it is preferably co-located within an Access Gateway (AG) such as a GPRS Gateway Support Node (GGSN) in a General Packet Radio Service (GPRS) core network. Related architectures are provided for 3GPP2 networks and TISPAN Next Generation Networks.

When a User Equipment (UE) initiates a data session, an IP address is assigned to it by an appropriate AG. The AG provides this IP address, together with, for example, an NAI, IMSI, or MSISDN, to the PS which in turn downloads into the AG a set of policy rules to be applied to the data session. When the UE communicates with a (final) Application Function (AF), the AF provides session details to the PS. When the UE subsequently requests resources for the service provided by the AF, the PS downloads into the AG a further set of policy rules based on the session details provided by the AF. In a 3GPP network, the AF may be a Proxy Call Session Control Function, P-CSCF, or another kind of application server to which the UE establishes an application communication via bearer(s) set up via IP-CAN session(s) through the AG.

Typically, a policy rule comprises a 5-Tuple vector describing a session (namely; orig IP-addr/port, dest IP-addr/port, protocol—TCP/UDP). The PCEF inspects packets to detect the relevant tuples and apply the rules. However, this technique allows only a limited (coarse) analysis of packets, as it does not allow packet inspection beyond these five IP headers, e.g. it does not allow inspection of payload data.

Inspecting packets at a deeper level, so-called Deep Packet Inspection (DPI), is possible, but is obviously more time and resource consuming, and can be unnecessary for some services. For example, an operator might be interested on applying PCC rules to "peer-to-peer" services, but not to other Internet-based services. DPI may also be employed for charging purposes. Typically, the DPI functions are passive elements. This means that they just "sniff" the IP packets but they do not manipulate them. Hence, if the outgoing IP packets in the uplink direction (UL) include the user IP address assigned by the gateway, the incoming IP packets in the downlink (DL) will be routed directly to the AG, thereby skipping the control function of the DPI node.

A solution is to implement a DPI node cooperating with a Network Address Translator (NAT). Such an architecture (3GPP TS 23.203) is illustrated in FIG. 1. The DPI implements the "Gx" interface so as to communicate with the PS when the session is initiated, and to receive policy rules from it. The AG in turn receive rules from the PS as to whether a packet is to be sent to the NAT or directly towards the appropriate AF (e.g. using standard routing tables). This allows, for example, packets relating to one service to be routed to the NAT and packets relating to another service to be sent directly to the appropriate AF (AF1 in the example of FIG. 1). The function of the NAT is to modify IP packets, sent by a UE, by changing the source IP address into a new ("NATed") IP address which maps to that source address. The NATed address is selected from a given IP addresses range "owned" by the NAT. The NAT forwards the modified packets to the DPI node for inspection. The DPI in turn forwards the packets to the allocated AF (AF2 in the example of FIG. 1). By configuring edge IP router(s) for the incoming traffic in the downlink direction to route the allocated IP address range towards the DPI node, this approach ensures that packets sent by the destination node to the source UE are routed first to the DPI. Thus, DPI of both outgoing and incoming packets is ensured, whilst at the same time avoiding the need to perform DPI on packets for which this is unnecessary. The resulting traffic flows, NATed and non-NATed, are illustrated in FIG. 2.

The decision to route a given subset of the traffic towards a DPI element can be taken by evaluating a set of policies in the PS. The decision could be based, for instance, on the protocol, TCP/UDP port, source/destination IP address, RAT type, subscriber information, QoS info and serving network.

FIG. 3 illustrates a first issue associated with the NAT approach to enabling DPI (of both outgoing and incoming packets), namely that the DPI node cannot provide the PS with the UE IP address assigned by the AG as it only knows the NATed address. Currently, the UE IP address is used in the PS to correlate the service control session (e.g. Gx session) and the service session of the AF according to the 3GPP PCC architecture (TS 23.203).

A second problem arises due to the PS using the UE IP address to identify the IP-CAN session characteristics to in turn decide what PCC rules shall be installed. This prevents the PS from using data from the service control session with the AG in the PCC rule decision towards the DPI node and vice versa (for instance, to control the IP-CAN session Maximum QoS). Moreover, this prevents the PS from being able to push PCC Rules to one PEP in response to some trigger received from another PEP (for instance, to take action on the bearer QoS in the AG due to usage reporting by the DPI node).

Referring to FIG. 4, this shows that the DPI node is not involved during the General Bearer set-up (e.g. PDP context Creation, steps 1 to 7). For the DPI node, the trigger for the service control session creation towards the PS is the reception of the RADIUS Accounting start (steps 9 and 10). Although other data such as the subscriber IMSI is sent by the AG both to the PS and through the RADIUS interface (and hence is available to the DPI node), this information does not necessarily uniquely identify the IP-CAN session, due to the possibility of a user setting up several IP-CAN sessions (using different IP addresses). The absence of the UE IP address in the DPI node restricts the policy evaluation processes that may be employed by the network operator. At least the following 4 deficiencies had been identified:

1. The PS cannot properly control the characteristics set for an IP-CAN session, for example the maximum QoS per IP-CAN session, as each service control session behaves as a different IP-CAN session in the PS.

2. As a result of this policy evaluation process, the PS cannot decide to take actions to be enforced in the AG as well as in the DPI node.
3. The policy evaluation process initiated by the DPI node cannot be enhanced by evaluating session data sent to the PS by the AG in the initial policy evaluation process.
4. The policy evaluation process initiated by the DPI node cannot take into account the service information that an AF may provide to the PS, e.g. via the Rx interface, so as to enforce the appropriate decisions.

The sequence diagram of FIG. 5 illustrates a second issue with the NATed approach to DPI. In particular, FIG. 5 shows a session correlation problem that arises when the AF is involved for dynamic service sessions (FIG. 5 is a simplified diagram, showing only those steps relevant to the problem). It is assumed that the UE has established a bearer so that AF signaling can be negotiated.

According to the Figure, UE-A negotiates a dynamic service session with UE-B, including Session Description Protocol (SDP) offer using its own IP address (IP-A). The other end sends an SDP answer with its own IP address (IP-B). The PS in the originating network generates PCC Rules with Service Data Flow for uplink (UL) and downlink (DL) directions that are installed in Access GW-A. For the UL direction, Service Data Filter contain: Source IP address is set to IP-A and destination IP address is set to IP-B. For the DL direction, Service Data Filter contains: Source IP address is set to IP-B and destination IP address is set to IP-A.

The PS in the originating network discovers that that the IP session contains a NATed IP address, so that PCC Rules should also be installed in the DPI. The new PCC Rule is generated with Service Data Flow for UL and DL directions that are installed in DPI.

For the UL direction, Service Data Filters contains: Source IP address is set to IP-X and destination IP address is set to IP-B. For the DL direction, Service Data Filter contains: Source IP address is set to IP-B and destination IP address is set to IP-X.

The PS in the destination network generates PCC Rules with Service Data Flow for UL and DL directions that are installed in Access GW-B. For the UL direction, Service Data Filter contains: Source IP address is set to IP-B and destination IP address is set to IP-A. For the DL direction, Service Data Filter contains: Source IP address is set to IP-A and destination IP address is set to IP-B.

FIG. 6 illustrates what happens when UE-A decides to send packets to UE-B after session negotiation is terminated, over the bearer that corresponds to UL TFT=IP-B and port B. Access GW-A finds that packets match Service Data Flow for PCC Rule A, enforces the PCC Rule and forwards the packet. The packet transverses the NAT (that replaces IP-A by IP-X) and forwards the media packet. The packet is sent to the DPI that takes the decision to forward the media packet to the destination network. Access GW-B finds that the received packets do not match any Service Data Flow in PCC Rule B, so it drops the packets.

SUMMARY

According to a first aspect of the present invention there is provided a method of handling packets sent across a packet switched network comprising a policy server acting as a policy and charging rules function. The method comprises providing a first set of policy rules at said policy server, and installing these from the policy server into an access gateway over a first service control session. These policy rules cause packets belonging to a given IP session to be diverted by the access gateway to a network address translator. At the network address translator, an IP source address of said packets is translated into a translated IP source address identifying a deep packet inspection node. The network address translator forwards the packets to the deep packet inspection node configured to perform deep packet inspection of IP packets.

A second set of policy rules is provided at said policy server, and these are installed from the policy server into said deep packet inspection node over a second service control session, the second set of policy rules being applied by the deep packet inspection node to said packets upon receipt.

The method is characterized by the steps of:
allocating a token to said IP session that uniquely identifies the session, and providing the token to the policy server and the access gateway;
sending said token from the access gateway to the deep packet inspection node via said network address translator;
sending said token from the deep packet inspection node to the policy server; and
at the policy server, using said token to associate said first and second service control sessions.

According to an embodiment of the invention, said step of allocating a token to said IP session may comprise generating said token at said policy server at establishment of said IP session. The token is generated at the policy server in response to receipt at the policy server of a policy evaluation request from said access gateway, the request including said IP source address, and the policy server including the token in a response sent to the access gateway. Said policy evaluation request may be a Diameter Credit Control Request. Said policy server may generate said token only if the access point name associated with the access gateway is on a prescribed list of access point names held by the policy server.

According to an alternative embodiment of the invention, said token may be generated at the access gateway in response to receipt at the access gateway of a general bearer request, with the access server including the token in a policy evaluation request sent to the policy server. Said policy evaluation request may be a Diameter Credit Control Request.

One mechanism for generating a token is to generate a hash of a subscriber identity, or a hash of said IP source address. The token may be sent within an accounting session identity field.

The step of sending said token from the deep packet inspection node to the policy server may comprise including the token in a policy evaluation request. The policy evaluation request may be a Diameter Credit Control Request.

The invention is applicable to a network comprising a GPRS core network, in which said access gateway is a GPRS Gateway Support Node.

The method may comprising:
receiving a Session Description Protocol offer at an application function of said network, the offer relating to establishment of a session between endpoints one of which is associated with said IP source address;
determining that the Session Description Protocol offer contains an IP source address that is subject to network address translation within the network;
replacing the IP source address within the Session Description Protocol offer with said translated IP source address; and
forwarding the Session Description Protocol offer towards its destination.

The step of determining that the Session Description Protocol offer contains an IP source address that is subject to network address translation within the network may comprise sending said IP source address from the application function to a policy server or a network address translator and receiving in response said corresponding translated IP source address. Said IP source address is sent within a Diameter AAA message, and the corresponding translated IP source address is returned in a Diameter AAR message.

The method is applicable to a packet switched network comprising an IP Multimedia Subsystem, where said application function is a Proxy Call Session Control Function.

According to a second aspect of the present invention there is provided a policy server for implementing policy and charging control in a packet switched network. The policy server comprises a service control session handling unit for establishing service control sessions with an access gateway and a deep packet inspection node respectively, and for delivering policy rules across said service control sessions, said policy rules relating to an IP session across the packet switched network. The server further comprises a token handling unit for receiving or generating a token that is uniquely associated with the service control session between the policy server and the access gateway, and for receiving a token from said deep packet inspection node that is uniquely associated with the service control session between the policy server and the deep packet inspection node, and for informing said service control session handling unit if the tokens match. The service control session handling unit is arranged to associate said service control sessions and deliver policy rules as appropriate.

According to a third aspect of the present invention there is provided a deep packet inspection node for implementing deep packet inspection of packets traversing a packet switched network. The node comprises a first receiver for receiving from an access gateway, via a network address translator, an accounting start message containing a token uniquely identifying the IP session to which the accounting start message relates, and a sender for sending to a policy server of the packet switched network, a policy evaluation request containing a translated IP source address of said message and said token. The node further comprises a second receiver for receiving from said policy server a set of policy rules allocated to said IP session.

According to a fourth aspect of the present invention there is provided an access gateway for use in a packet switched network and being configured to operate as a policy enforcement point of the network. The access gateway comprises a receiver for receiving a general bearer request from a user equipment to establish an IP session, and a token handling unit for receiving from a policy server, or for generating and sending to a policy server, a token that is uniquely associated with said IP session. The access gateway further comprises a sender for sending an accounting start message to a deep packet inspection node via a network address translator, the message including said token.

According to a fifth aspect of the present invention there is provided a method of facilitating session establishment between endpoints across a packet switched network. The method comprises receiving a Session Description Protocol offer at an application function of said network, and determining if the Session Description Protocol offer contains an IP source address that is subject to network address translation within the network. If said IP source address is subject to such network address translation, the IP source address within the Session Description Protocol offer is replaced with a corresponding network address translation IP source address. The Session Description Protocol offer is forwarded towards its destination.

Said step of determining if the Session Description Protocol offer contains an IP source address that is subject to network address translation within the network comprises sending said IP source address from the application function to a policy server or a network address translator and receiving in response a corresponding network address translation IP source address.

Said IP source address may be sent within a Diameter AAA message, and the corresponding network address translation IP source address returned in a Diameter AAR message.

Said packet switched network may comprise an IP Multimedia Subsystem, with said application function being a Proxy Call Session Control Function.

According to a sixth aspect of the present invention there is provided apparatus configured to operate as an application function within a packet data network. The apparatus comprises a receiver for receiving a Session Description Protocol offer from a user equipment, and an offer handler for determining if the offer contains an IP source address that is subject to network address translation within the network and, if so, for replacing the IP source address within the Session Description Protocol offer with a corresponding network address translation IP source address. The apparatus further comprises a sender for sending the modified Session Description Protocol offer towards its destination.

DETAILED DESCRIPTION

Figure 1:
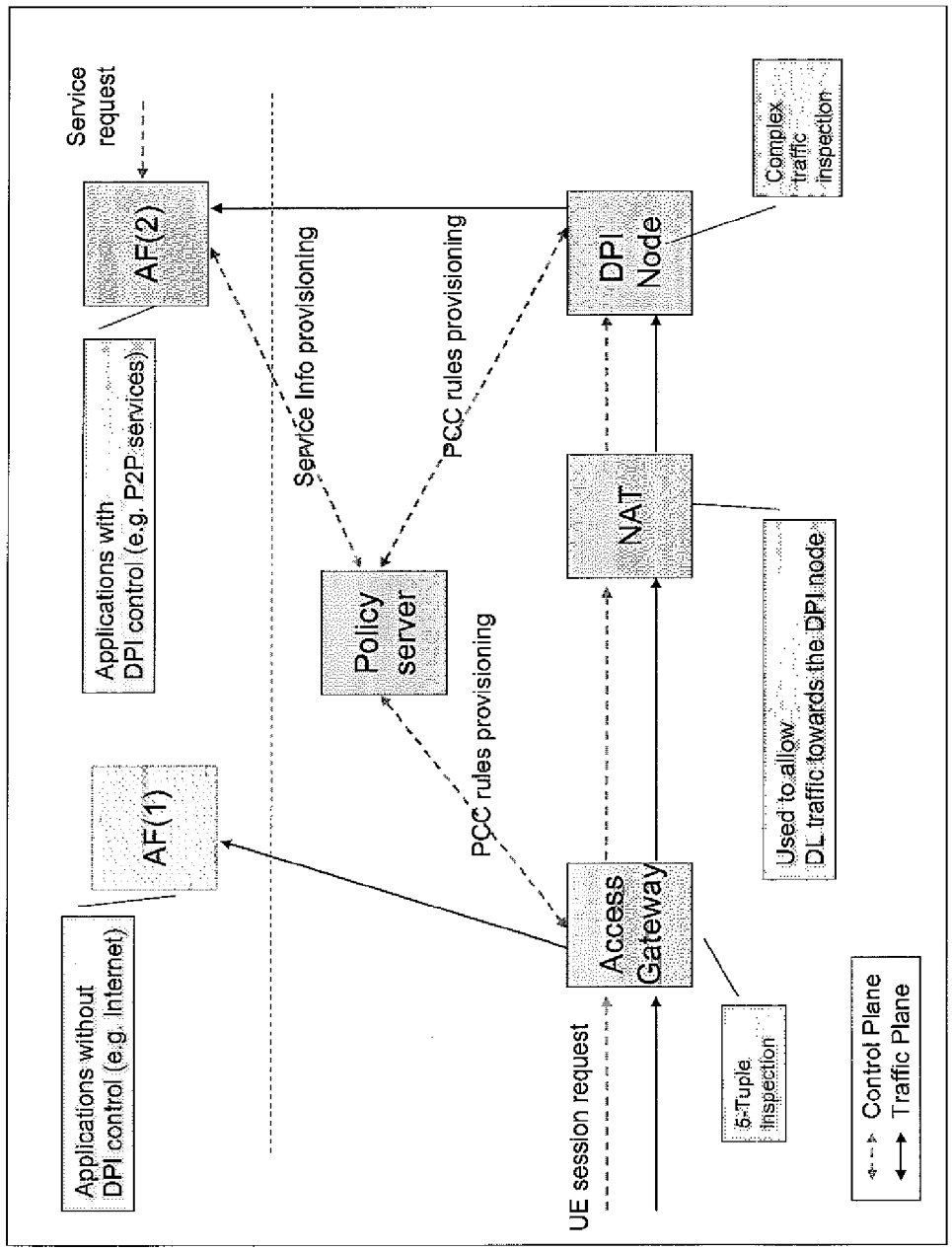
FIG. 1 illustrates schematically a packet network architecture with provisioning for Deep Packet Inspection.
Figure 2:
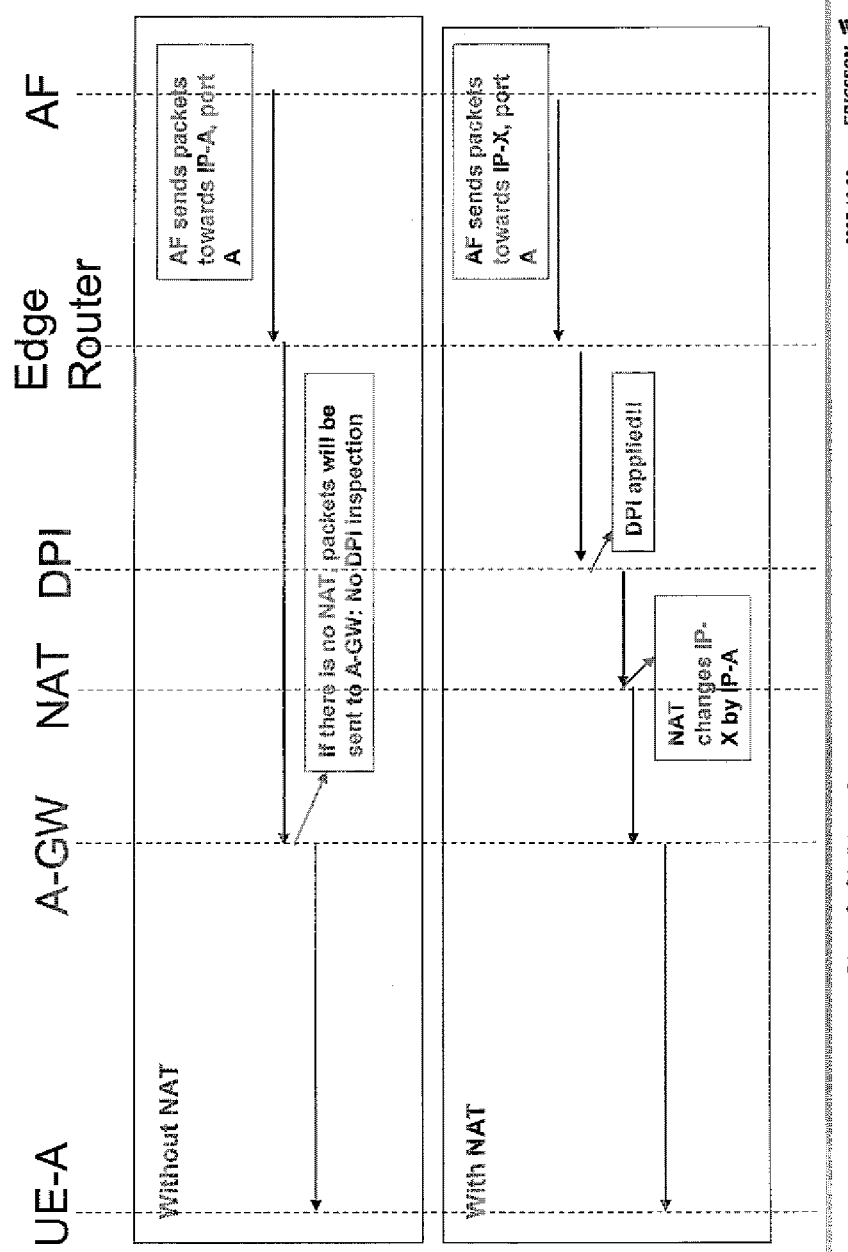
FIG. 2 illustrates a signaling flow in the architecture of FIG. 1 both with and without IP address NATing.
Figure 3:
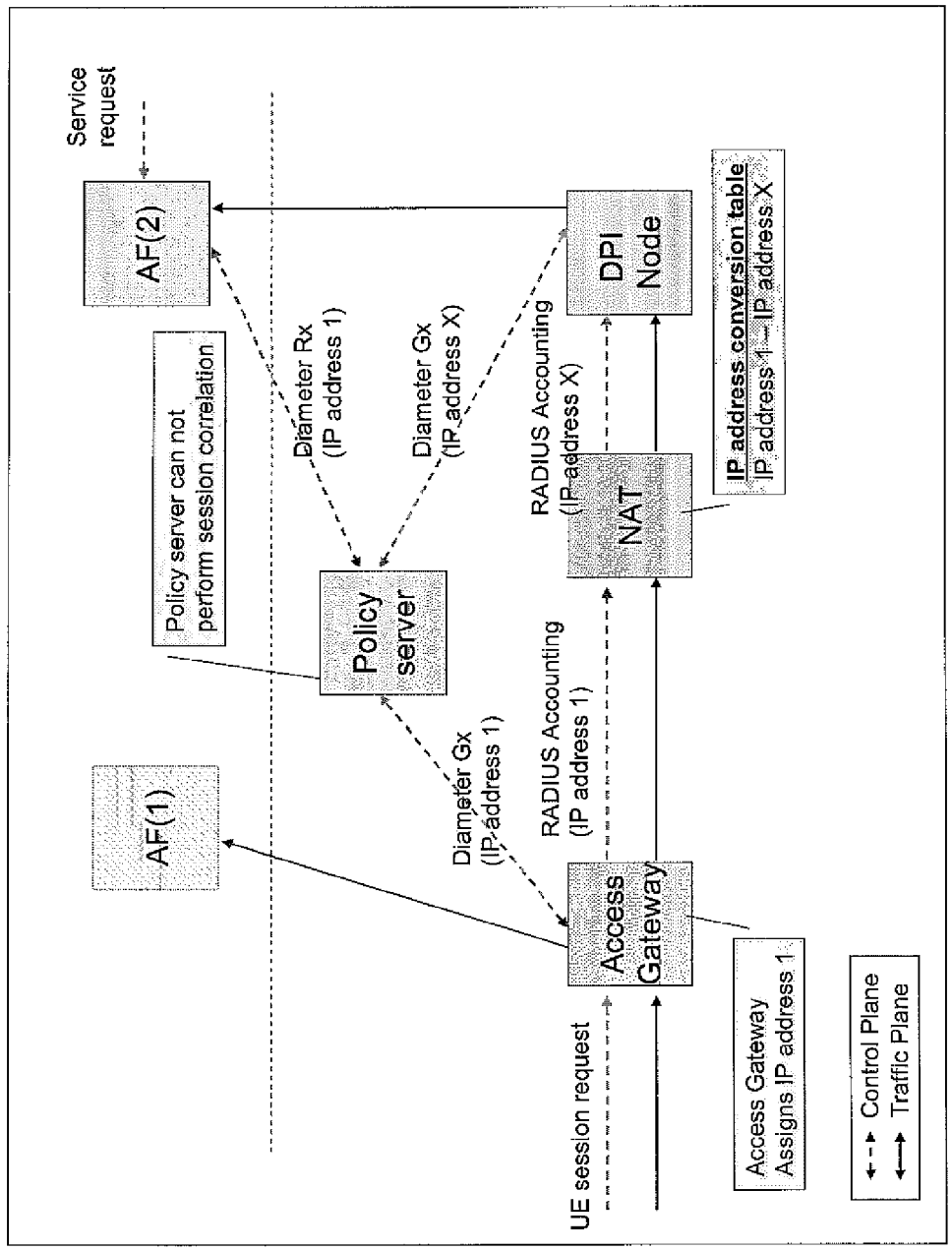
FIG. 3 illustrates a problem that arises in the architecture of FIG. 1 due to IP address NATing.
Figure 4:
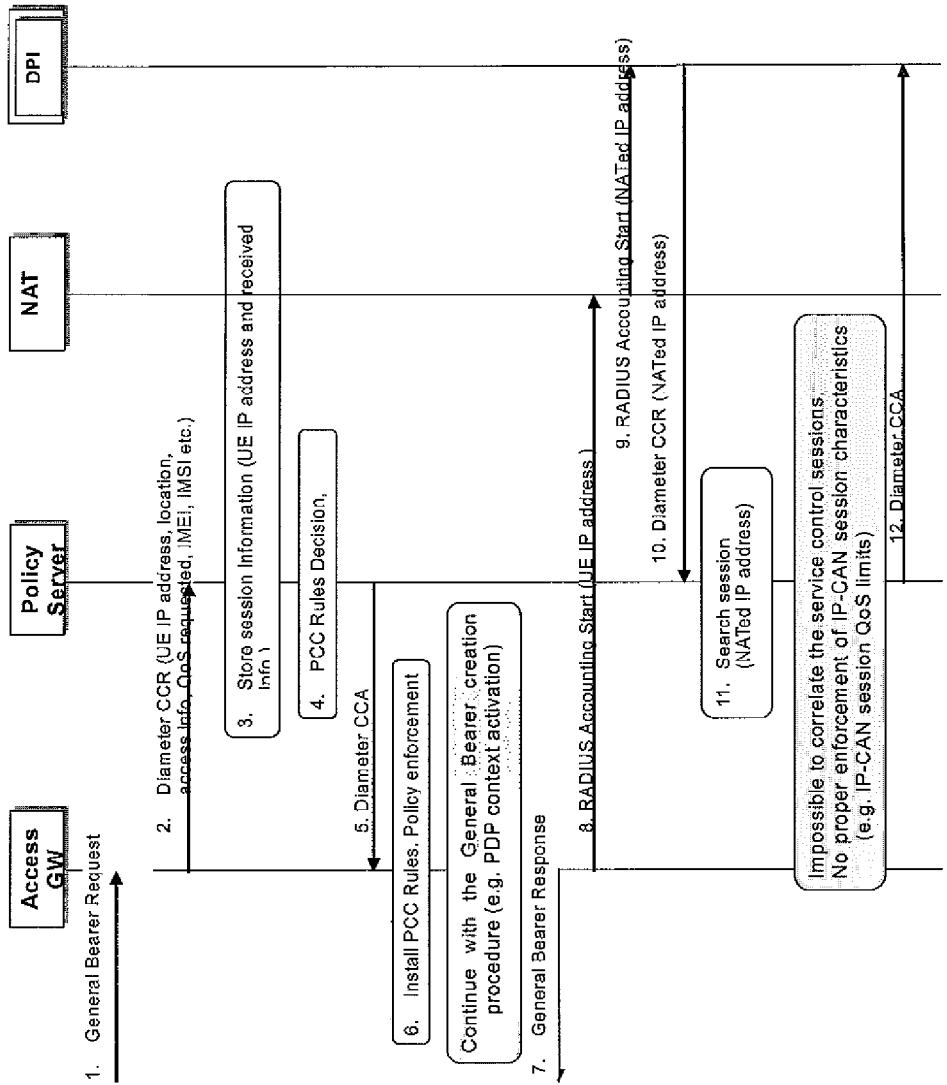
FIG. 4 is a signaling flow in the network architecture of FIG. 3, further illustrating the problems that arise due to NATing.
Figure 5:
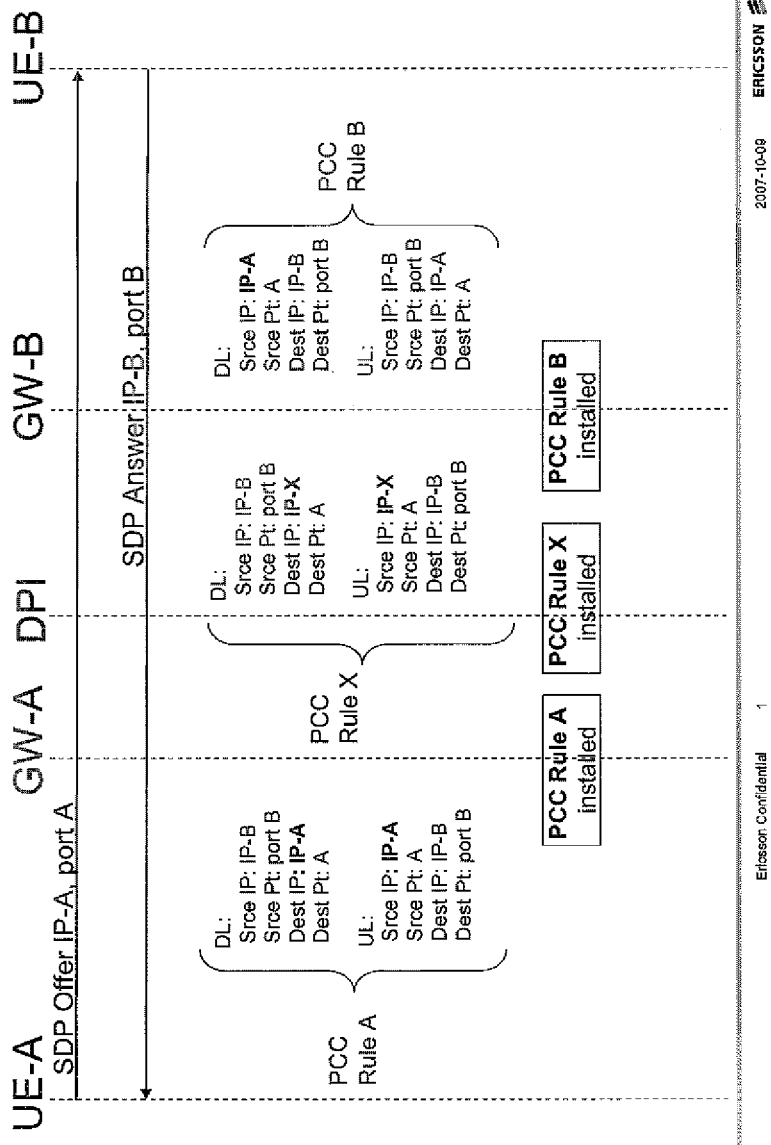
FIG. 5 illustrates PCC rules installation on the originating and destination sides of an IP session involving NATing.
Figure 6:
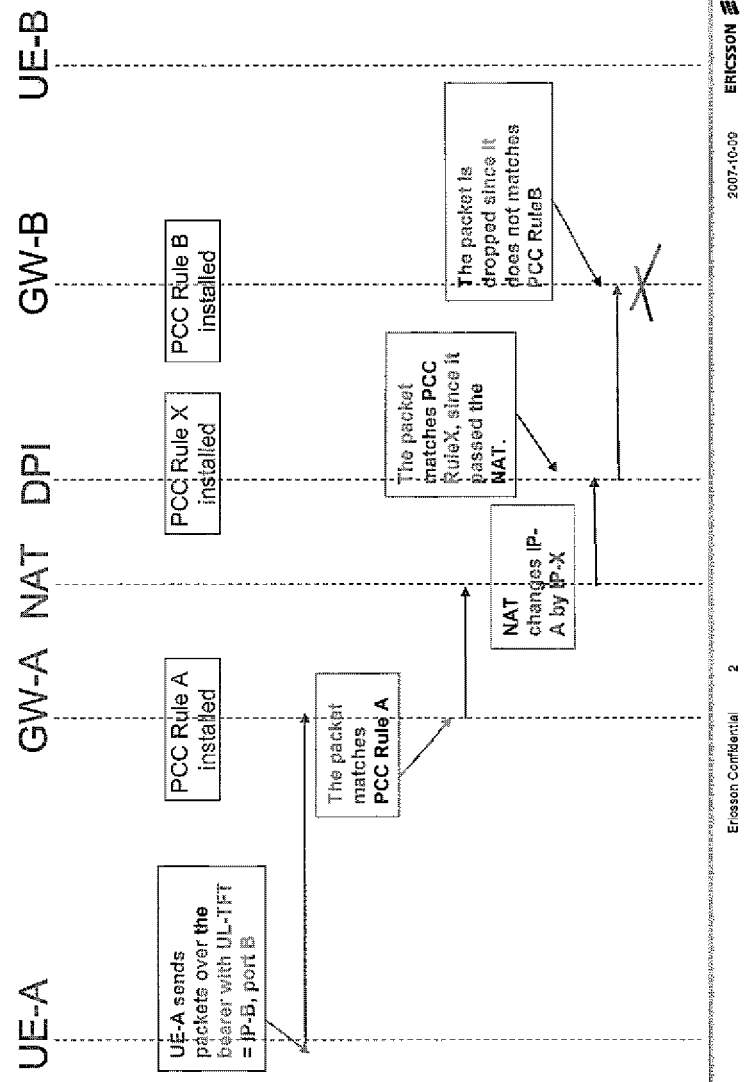
FIG. 6 illustrates a signaling flow associated with an established IP session, and in particular the dropping of packets that can arise due to NATing.
Figure 7:
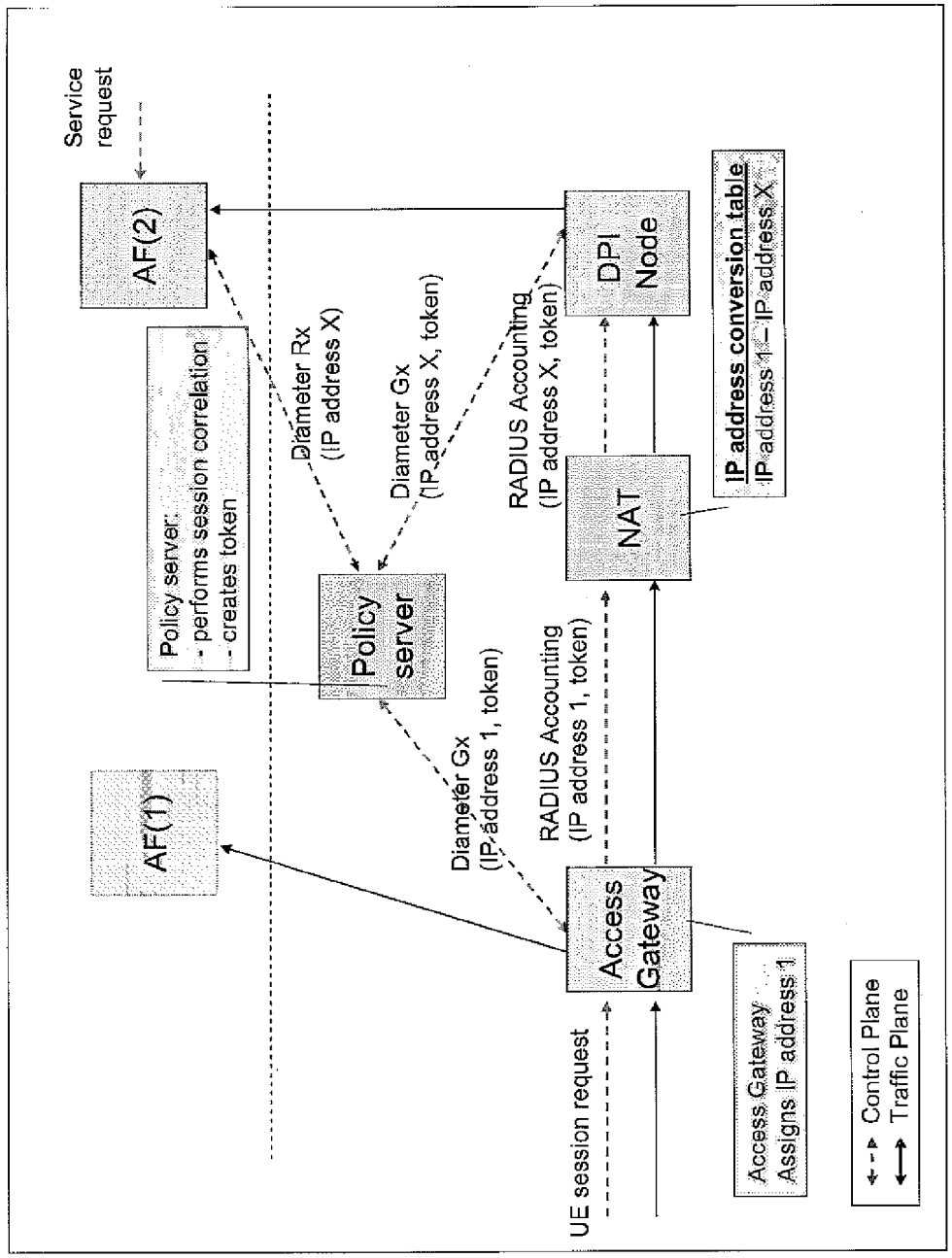
FIG. 7 shows a packet network architecture and a session establishment procedure for mitigating problems arising from NATing.
Figure 8:
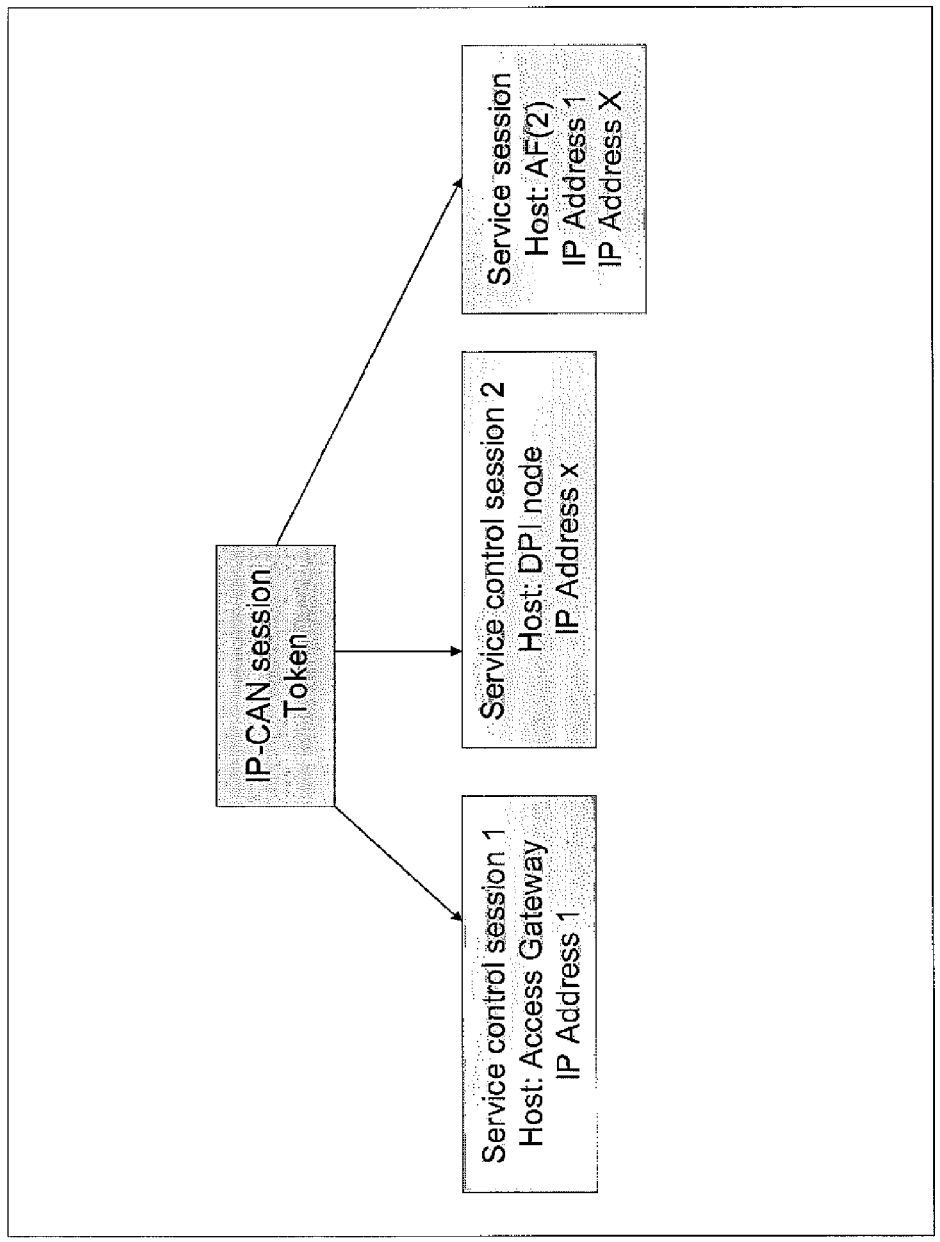
FIG. 8 illustrates schematically a correlation of PCC related information stored at the Packet Server.

In order to address the problems identified above and which arise from the use of a NAT to facilitate Deep Packet Inspection (DPI), it is proposed here to use a token to link within the Policy Server (PS) a given Service Control Session (e.g. Gx session between the PS and the Access Gateway (AG)) with the corresponding Service Sessions (e.g. Rx session between the PS and an Application Function (AF)) for the same IP-CAN session, where an IP-CAN session refers to the IP session existing between a User Equipment UE and the network, identified by an IP address. The shared token should uniquely identify the IP-CAN session Hence, different IP-CAN sessions shall be identified by different values of the token. A mechanism is also proposed for distributing this token among all the affected network elements. The proposed approach is illustrated in FIG. 7, whilst FIG. 8 shows how the correlation information is stored in the PS.

The token can be created either by the AG and sent to the PS during the initial policy evaluation process, or it can be created by the PS and, upon the reception of the initial policy evaluation request, sent to the AG. In the case where the AG provides the token, as a result of the policy evaluation process, the AG shall route a subset of IP packets towards the DPI node and the AG shall provide the token to the DPI node. Thus, the DPI node can include the token in the policy evaluation request to the PS. In this way, the PS is able to identify the AG service control session with the DPI node service control session for the same IP-CAN session. FIG. 7 illustrates the solution that involves the PS creating the token. This implies that the PS shall know when the DPI is going to be used, for instance, for which APNs. The PS includes the token in the answer towards the AG, which then forwards it to the DPI node. Both solutions enable account to be taken of the Service session information in the policy evaluation processes to be enforced in the DPI node.

A possible implementation involves including the token within the Accounting Session ID field used in RADIUS protocol. This means that the AG shall create the token and include it as the Accounting Session ID in the policy evaluation request sent to the PS. Subsequently, when sending the RADIUS Accounting Start message, the same Accounting Session ID shall be used. The advantage of this approach is that it avoids the need to introduce a new parameter into the RADIUS protocol.

Another implementation involves generating the token by applying a one-way hash function to the real user identity (MSISDN, for example). Entropy may be added by applying the hash function to a combination of the user identity and a time dependant value, e.g. Seed=SHA-1(MSISDN, CurrentTimeInMilliSeconds). This function produces a 160 bit output that can be used to generate the token (truncated to the desired number of bits), i.e. Token=First_64_bits (Seed). Yet another implementation involves generating the token by applying a one-way hash function to the real UE IP address.

When the AG is responsible for creating the token, it should do this before contacting the PS so that the first query to the PS includes the token. The PS stores the token with the other session information. When it is the PS that creates the token, the PS should do this before answering to the policy evaluation request from the AG, so that the token can be included in the response. As before, the PS stores the token internally with the other session information. If the PS has prior knowledge of which APNs have a NAT deployed, it may only create the token for those APNs. Note that the PS receives the APN data from the AG in the first policy decision query.

The remainder of this document assumes that it is the PS that is responsible for token generation.

The token should be distributed among the involved nodes during the IP-CAN session establishment procedure as explained below. The PS maintains the association between both service control sessions and the IP-CAN session using the token. Therefore, in subsequent procedures over any of these service control sessions, the token does not need to be included as the PS is able to correlate the sessions. When the PS receives a session termination indication for an IP-CAN session from any of the policy enforcement points (i.e. AG or DPI node), the PS can properly terminate all the service control sessions related to that IP-CAN session. The correlation among them is also internally removed. The PS also removes both service control sessions and the internal correlation information in response to certain internal triggers, for example a change in the subscription data.

Figure 9:
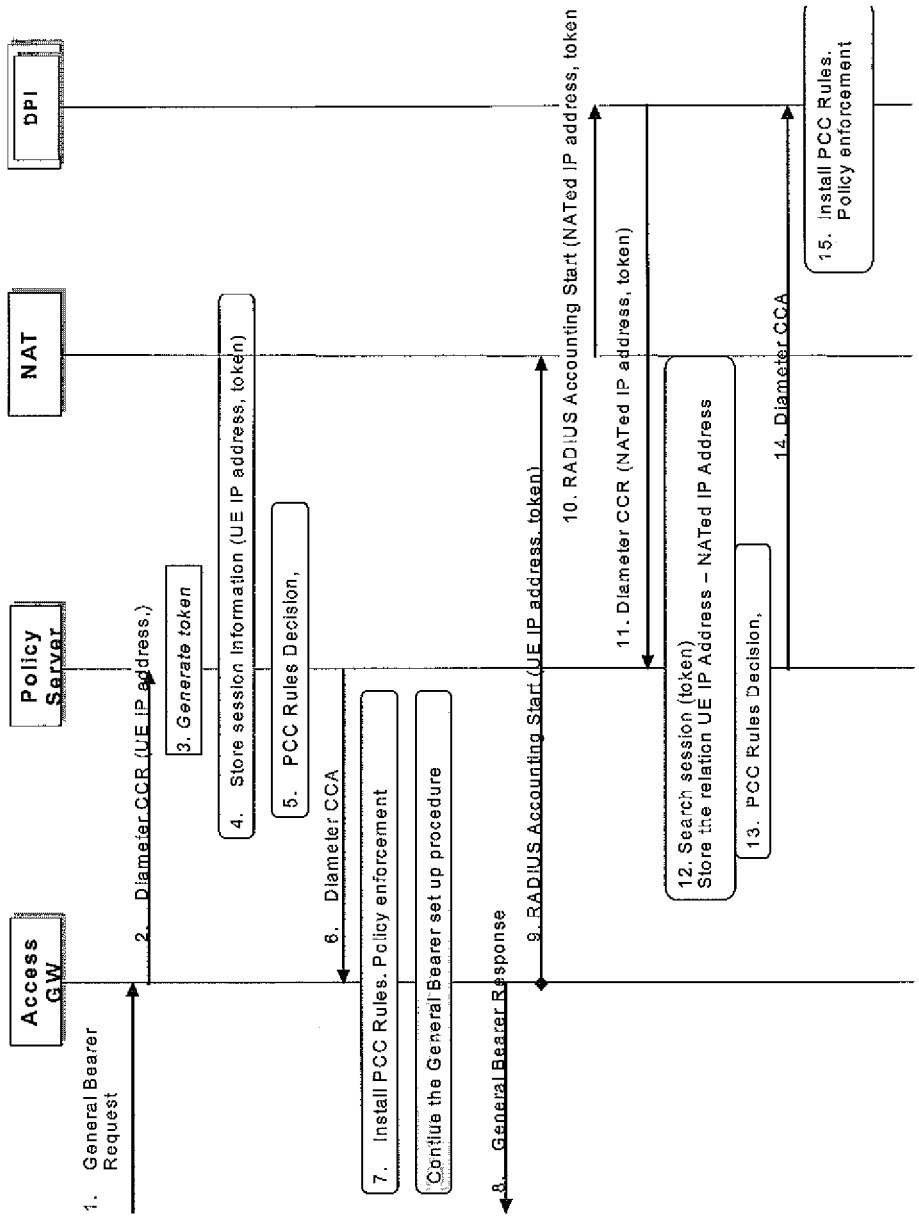
FIG. 9 illustrates in more detail a signaling flow across the network architecture of FIG. 7.

FIG. 9 illustrates the flow of control signaling, described as follows:

1. The AG receives a General Bearer request. This event triggers the creation of an IP-CAN session in the PS.
2. The AG contacts the PS to evaluate the applicable policies for that subscriber. In 3GPP, this is a Diameter CCR message that contains the UE IP address assigned by the AG.
3. The PS creates a token for that IP-CAN session (n.b. this token must be unique, so it cannot be the UE IP address)
4. The PS shall store the session information, including the UE IP address and the token.
5. The PS evaluates the applicable policies and creates the PCC rules to be enforced by that AG.
6. The PS sends the PCC rules to the AG in a Diameter CCA message, including the token, e.g. in a proprietary Attribute Value Pair (AVP).
7. The AG installs the PCC rules. The rest of the procedure for the establishment of the General Bearer continues.
8. The General Bearer Request is accepted to the UE
9. The AG starts the Accounting session with a AAA server over the Gi interface. This interface (Gi) is "sniffed" by the DPI node. [In some cases the DPI may perform AAA tasks.] The messages that trigger an action in the DPI node are the radius Accounting messages. The RADIUS Accounting Start message includes the UE IP address assigned by the AG and the token.
10. In this network configuration, the radius traffic towards the DPI node is routed through a NAT. Hence, the NAT removes the UE IP address assigned by the AG and includes one of the IP addresses under its control (named NATed IP address in this document), and the token received in step 9.
11. The DPI node requests a policy evaluation to the PS for that session and subscriber. In this scenario, the DPI node sends a diameter CCR including the NATed IP address and the token (in a proprietary vendor-specific AVP).
12. With this information, the PS is able to search for the subscriber's IP-CAN session being controlled by both the AG and DPI nodes. By using the token, the PS can therefore establish a relationship between the (non-NATed) UE IP address and the corresponding UE NATed IP address. The relationship can be stored locally by the PS, to be used in further interactions involving these IP addresses.
13. The PS evaluates the applicable policies and creates the PCC rules to be enforced by that DPI node.
14. The PS sends the PCC rules to the DPI node in a Diameter CCA message.
15. The DPI node installs the PCC rules The system is now ready to shape the traffic plane.

Figure 10:
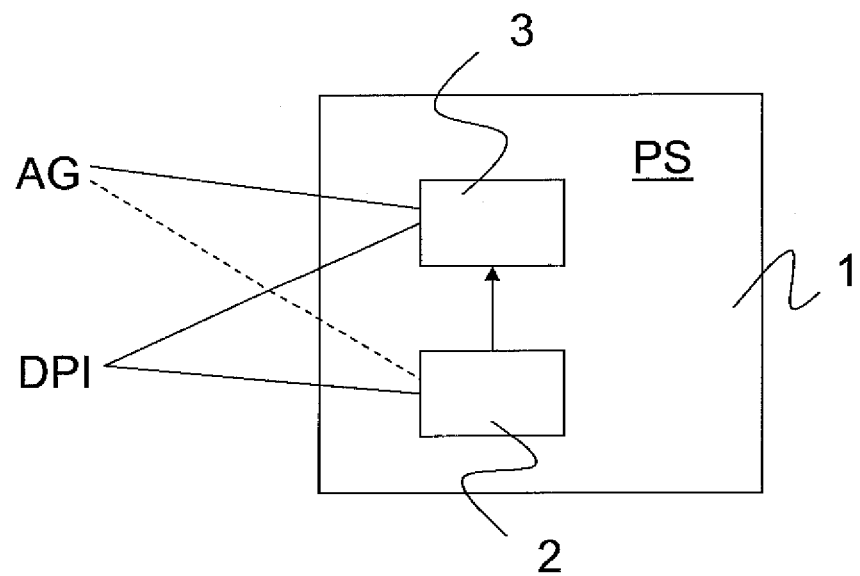
FIG. 10 illustrates schematically a packet server architecture.

FIG. 10 illustrates in simplified schematic form a packet server (PS) 1 for use with the approach described above. The PS comprises a service control session handling unit 3 functionally connected to the AG and the DPI. This unit 3 manages the service control sessions with these two network elements, and delvers policy rules across the sessions. A token handling unit 2 is functionally connected to at least the DPI. The unit 2 either generates the token at session establishment or receives it from the AG. When a token is received from the DPI, the handling unit informs the service control session handling unit if a match is found. If so, the service control session handling unit selects and provides the appropriate policy rules to the DPI.

Figure 11:
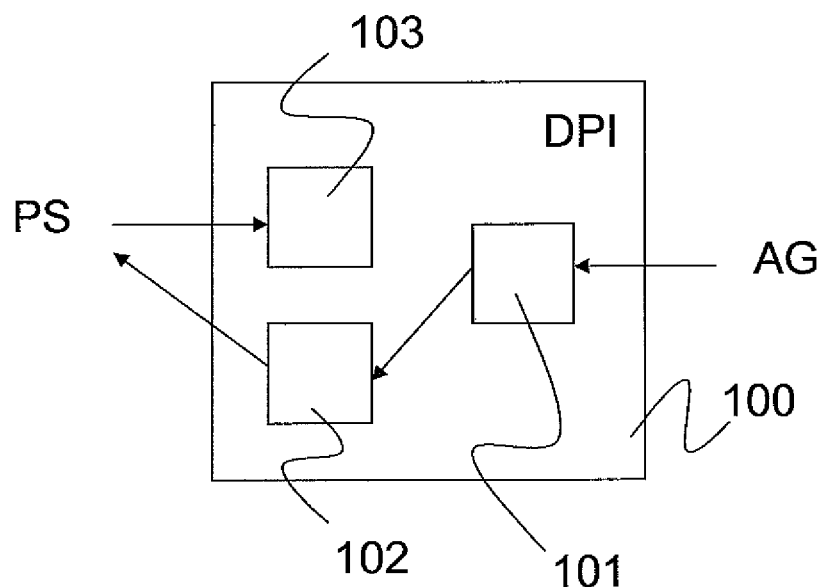
FIG. 11 illustrates schematically a Deep Packet Inspection node architecture.

Referring now to FIG. 11, this illustrates schematically the DPI 100. The DPI comprises a first receiver 101 for receiving from an access gateway, via a network address translator, an accounting start message containing a token uniquely identifying the IP session to which the accounting start message relates. It further comprises a sender 102 for sending to a policy server of the packet switched network, a policy evaluation request containing a translated IP source address of said message and said token, and a second receiver 103 for receiving from said policy server a set of policy rules allocated to said IP session.

Figure 12:
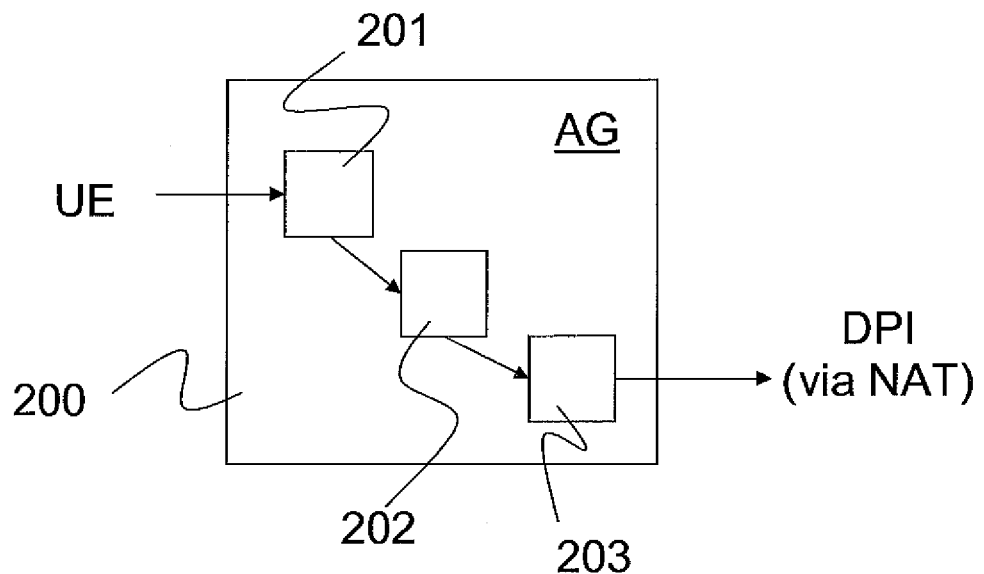
FIG. 12 illustrates schematically an access gateway architecture.

FIG. 12 illustrates schematically an AG 200 which comprises a receiver 201 for receiving a general bearer request from a user equipment (UE) to establish an IP session. A token handling unit 202 is configured to receive (from the PS) or generate a token that is uniquely associated with said IP session. The AG further comprises a sender 203 for sending an accounting start message to the DPI via a network address translator, the message including said token.

In order to address the issue of the destination side AF dropping packets because they contain unrecognised NATed source IP addresses, it is proposed to replace IP addresses in dynamic service sessions (for example IMS sessions). This can be done in two different ways:
1. Receipt of an SDP offer at the originating side AF causes the AF to check with the NAT or with the PS, whether or not the IP address should be replaced in the SDP offer before sending the SDP offer to the other end. If replacement is required, the NAT or PS provides the NATed address to the AF.
2. In the case of the IP Multimedia Subsystem (IMS), the AF (i.e. the P-CSCF) may establish a service session with the PS at IMS registration. The PS returns the NATed IP address in the response to the AF at IMS subscriber registration.

Figure 13:
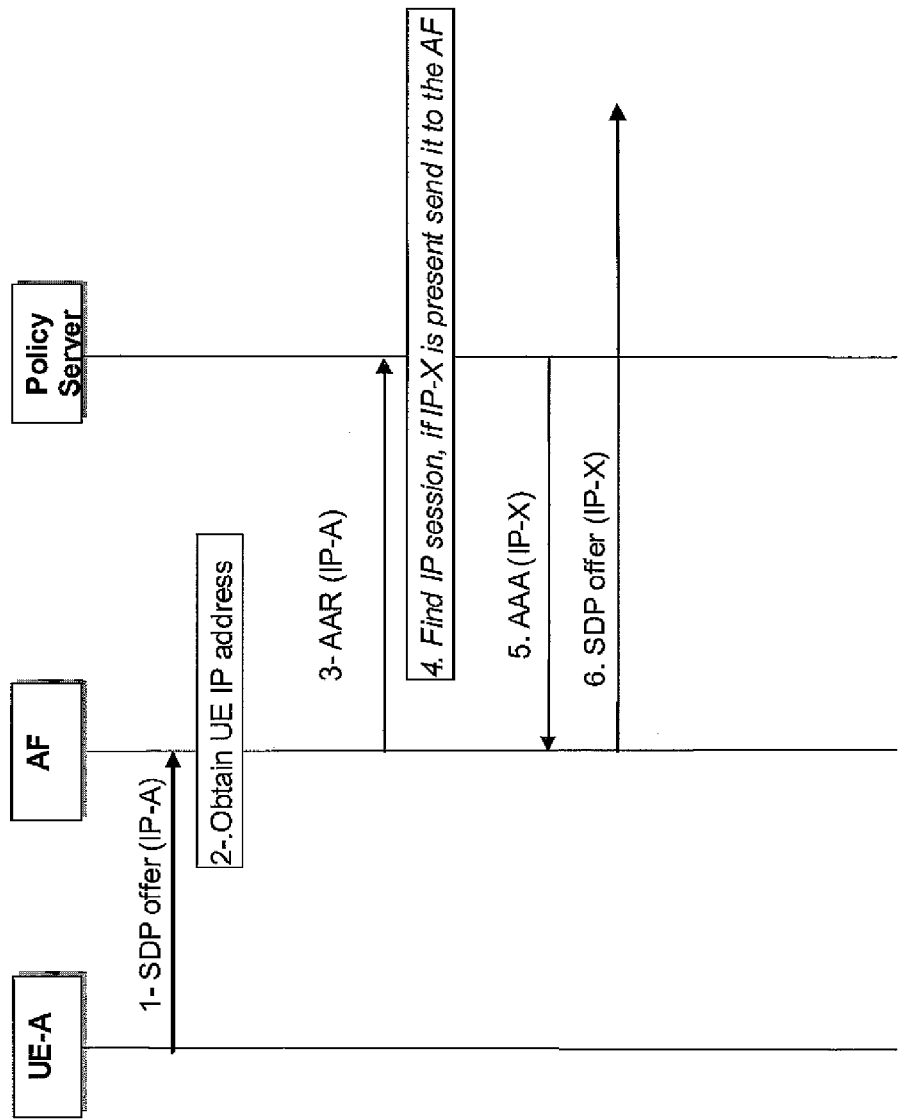
FIG. 13 illustrates a signaling flow associated with SIP session establishment via an Application Function.

The first option is illustrated in FIG. 13, where:
1. The UE-A sends an SDP offer with its own IP address,
2. The AF obtains the source IP address from the SDP received content,
3. The AF sends it to the PS,
4. The PS finds the NATed IP address,
5. The PS returns the NATed IP address to the AF,
6. The AF replaces the original source IP address with the NATed IP address (IP-X).

Rather than send the query to the PS, the AF might send the query to the NAT.

Considering the second option above, i.e. when the AF is a P-CSCF, the following is a valid sequence of events:
1. UE-A sends a registration request to the P-CSCF, including its own IP address.
2. The P-CSCF obtains the UE's real IP address from the SDP within the registration request, sends it to the PS which finds the NATed IP address that is returned to the AF.
3. AF stores the NATed IP address and uses it for the subsequent service session negotiations.

Figure 14:
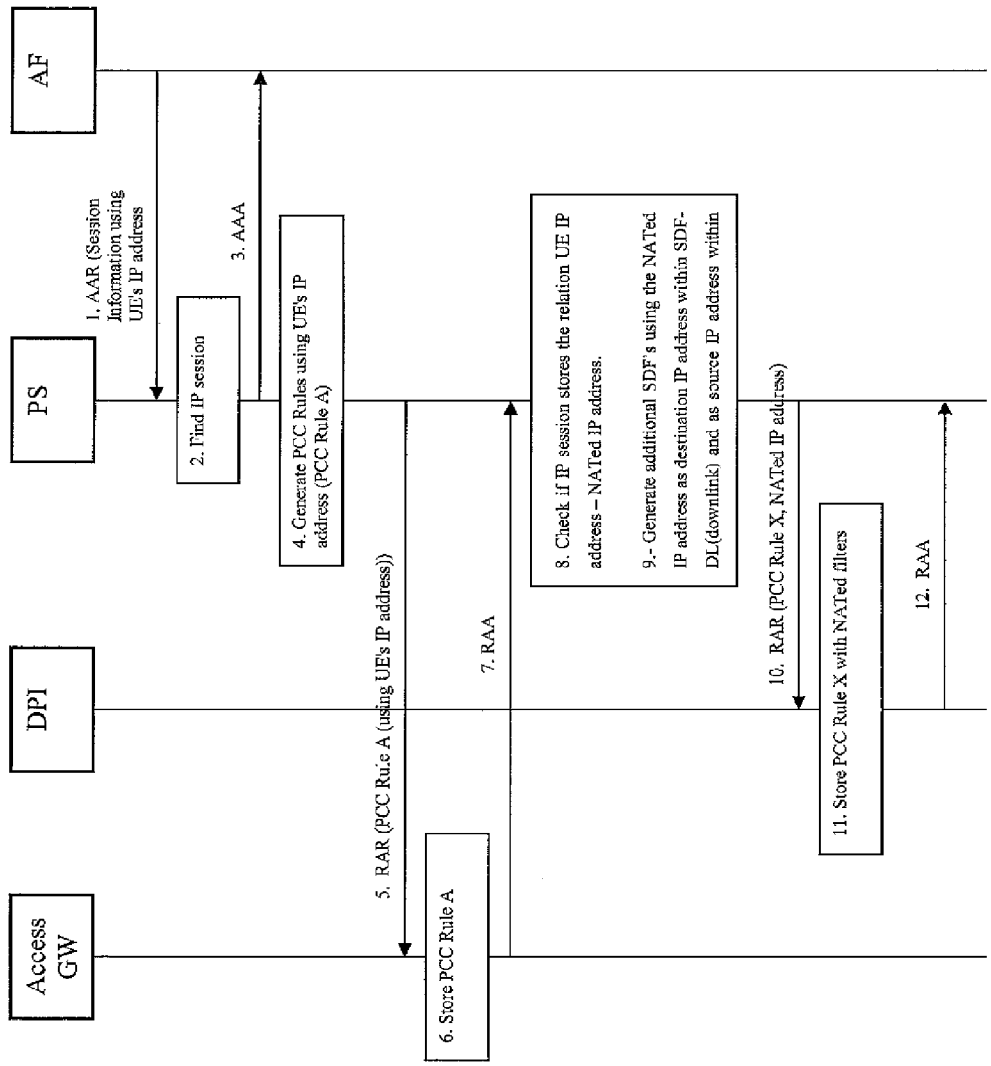
FIG. 14 illustrates a signaling flow associated with PCC rules installation in the Access Gateway and the Deep Packet Inspection node following on from the flow of FIG. 13.

Once both ends (that is UE-A and UE-B) have negotiated the service session characteristics, the originating side AF sends this information to the PS, as illustrated in FIG. 14 and described as follows:
1. The AF sends the negotiated Service Session Components to the PS. The UE-A IP address is sent as part of the session information.
2. The PS stores the information.
3. The PS acknowledges to the AF.
4. PCC Rules are generated; Service Data Flows contain the UE-A IP address. In this example, PCC Rule A is generated.
5. PCC Rule A (containing the UE-A IP address) is installed in the AG.
6. The AG decides if the Bearer QoS should be modified due to the installation of new PCC Rule A.
7. The AG sends a confirmation to the PS that PCC Rule A is installed.
8. The PS checks whether PCC Rules should also be installed in the DPI; if not the procedure terminates here.
9. The PS generates new PCC rules using the NATed IP address for both uplink and downlink directions. In this example, PCC Rule X is generated.
10. The PS provisions in the DPI the modified PCC Rule (PCC Rule X) that includes the NATed IP address.
11. PCC Rule X is installed in the DPI.
12. DPI sends an acknowledge to the PS.

Although not shown in FIG. 14, the AG in the UE-B network will receive a PCC Rule B. This PCC Rule B is generated by the destination side PS based on the session information received in the AF in the UE-B network. This session information will contain the NATed IP address of UE-A as this is the information received as part of the SDP in the AF.

Figure 15:
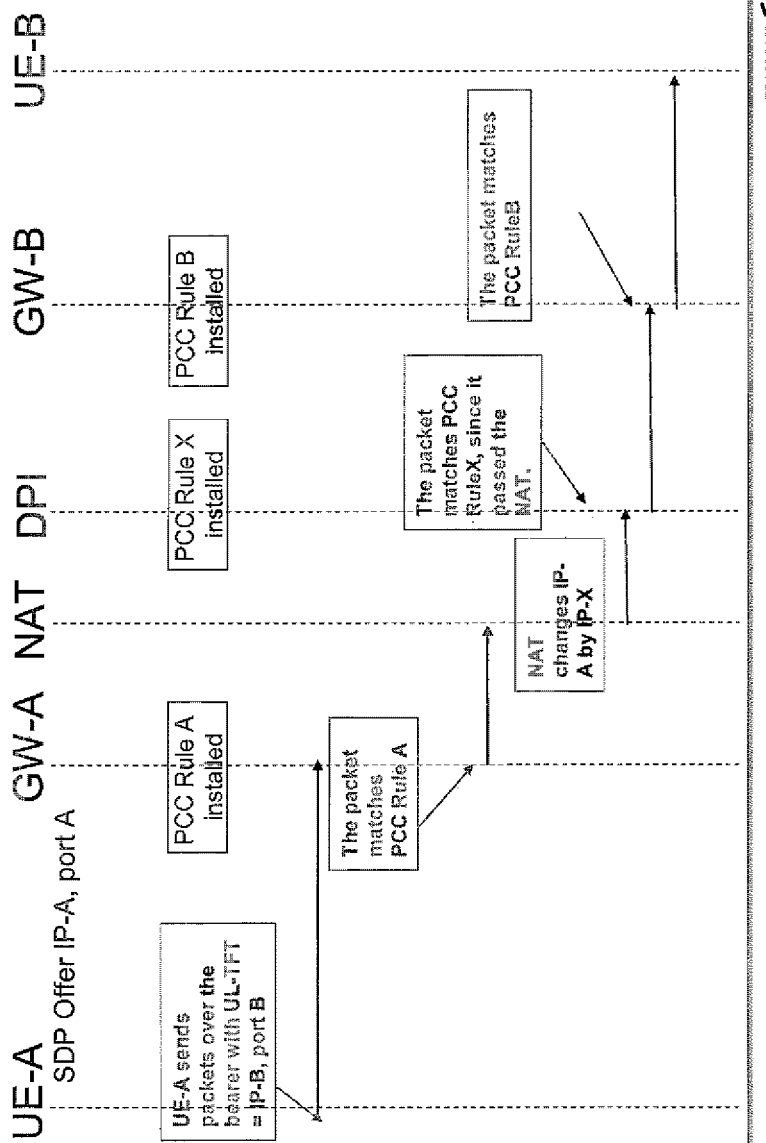
FIG. 15 illustrates schematically the end-to-end flow of packet associated with an established IP session.

Considering now media sent between UE-A and UE-B, this is handled as illustrated in FIG. 15. The illustrated steps are as follows:
1. UE-A decides to send media packets to UE-B after session negotiation is terminated, over the bearer that corresponds to UL TFT=IP-B and port B.
2. Access GW-A finds that a media packet matches Service Data Flow for PCC Rule A, as they contain the UE-A IP address, enforces the PCC Rule and forwards the packet.
3. The media packet traverses the NAT, with the NAT replacing the UE-A IP address with the NAT-ed IP address.
4. The media packet is received by the DPI, which in turn takes the decision to forward the media packet to the destination network.
5. Access GW-B finds that media packet matches a Service Data Flow, that in this case contains the NAT-ed IP address. GW-B enforces the PCC Rule B and forwards the packet to UE-B.

Figure 16:
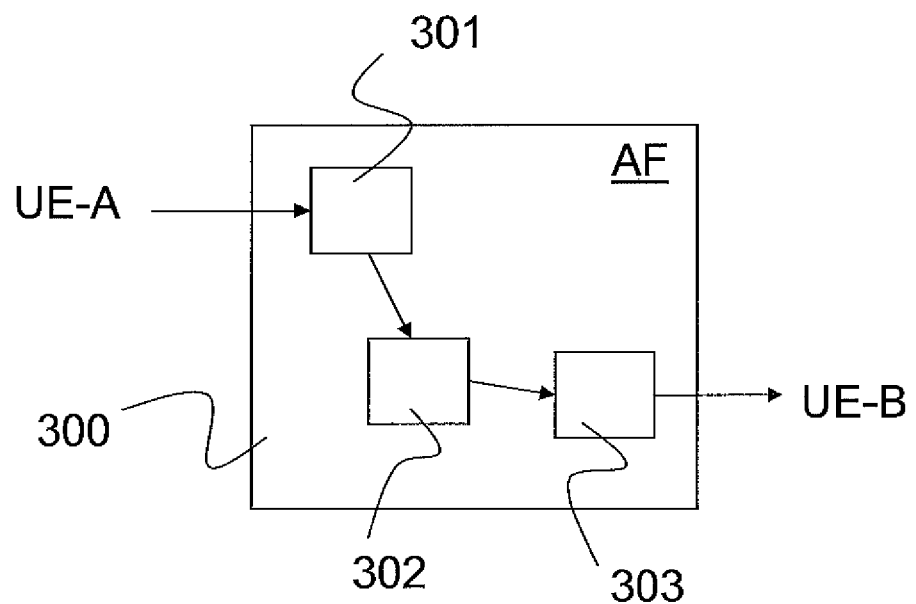
FIG. 16 illustrates schematically an Application Function node.

FIG. 16 illustrates schematically an application function (AF) 300 for use with the approach described above. The apparatus comprises a receiver 301 for receiving a Session Description Protocol offer from a user equipment, and an offer handler 302 for determining if the offer contains an IP source address that is subject to network address translation within the network and, if so, for replacing the IP source address within the Session Description Protocol offer with a corresponding network address translation IP source address. The AF further comprises a sender 303 for sending the modified Session Description Protocol offer towards its destination.

The token-based mechanisms described above enable the PS to associate all of the service control sessions for a given IP-CAN session even when any of the enforcement points (AG and DPI node) do not know the user IP address. They also enable the association of the service session from any AF to all service control sessions for a given IP-CAN session. Setting up these relations provides the following value-added functions to the operator's policy control solution:

- Enrichment of the policy evaluation process, as data provided by one Policy Enforcement Point (AG) can be used in the evaluation of policies to be enforced in the other node (e.g. DPI node). For example, in a 3GPP network, data sent by the GGSN to the PCRF via the Gx interface can be used in the evaluation of policies to be enforced in the DPI node.
- As a result of the policy evaluation initiated by the DPI node, certain control actions can be enforced in the AG.
- It is possible to enforce policy decisions in the DPI node related to the service information provided by the Application Function.

It will be appreciated by the person of skill in the art that various modifications may be made to the above described embodiments without departing from the scope of the present invention.

The invention claimed is:

1. A method of handling packets sent across a packet switched network comprising a policy server acting as a policy and charging rules function, the method comprising:
   providing a first set of policy rules at said policy server, and installing the policy rules from the policy server into an access gateway over a first service control session, the policy rules causing packets belonging to a given IP session to be diverted by the access gateway to a network address translator;
   at the network address translator, translating an IP source address of said packets into a translated IP source address identifying a deep packet inspection node, and forwarding the packets to the deep packet inspection node configured to perform deep packet inspection of IP packets;
   providing a second set of policy rules at said policy server, and installing the second set of policy rules from the policy server into said deep packet inspection node over a second service control session, the second set of policy rules being applied by the deep packet inspection node to said packets upon receipt,
   allocating a token to said IP session that uniquely identifies the session, and providing the token to the policy server and the access gateway;
   sending said token from the access gateway to the deep packet inspection node via said network address translator;
   sending said token from the deep packet inspection node to the policy server; and
   at the policy server, using said token to associate said first and second service control sessions.

2. The method according to claim 1, wherein allocating a token to said IP session comprises generating said token at said policy server at establishment of said IP session.

3. The method according to claim 2, said token being generated at the policy server in response to receipt at the policy server of a policy evaluation request from said access gateway, the request including said IP source address, and the policy server including the token in a response sent to the access gateway.

4. The method according to claim 3, wherein said policy evaluation request is a Diameter Credit Control Request.

5. The method according to claim 2, wherein said policy server generates said token only if the access point name associated with the access gateway is on a prescribed list of access point names held by the policy server.

6. The method according to claim 1, said token being generated at the access gateway in response to receipt at the access gateway of a general bearer request, and the access server including the token in a policy evaluation request sent to the policy server.

7. The method according to claim 6, wherein said policy evaluation request is a Diameter Credit Control Request.

8. The method according to claim 1, said token being one of a hash of a subscriber identity, and a hash of said IP source address.

9. The method according to claim 1, wherein said token is sent within an accounting session identity field.

10. The method according to claim 1, wherein sending said token from the deep packet inspection node to the policy server comprises including the token in a policy evaluation request.

11. The method according to claim 10, wherein said policy evaluation request is a Diameter Credit Control Request.

12. The method according to claim 1, wherein said access gateway is a GPRS Gateway Support Node of a GPRS core network.

13. The method according to claim 1, the method further comprising:
    receiving a Session Description Protocol offer at an application function of said network, the offer relating to establishment of a session between endpoints one of which is associated with said IP source address;
    determining that the Session Description Protocol offer contains an IP source address that is subject to network address translation within the network;
    replacing the IP source address within the Session Description Protocol offer with said translated IP source address; and
    forwarding the Session Description Protocol offer towards its destination.

14. The method according to claim 13, wherein determining that the Session Description Protocol offer contains an IP source address that is subject to network address translation within the network, comprises sending said IP source address from the application function to a policy server or a network address translator and receiving in response said corresponding translated IP source address.

15. The method according to claim 14, wherein said IP source address is sent within a Diameter AAA message, and the corresponding translated IP source address is returned in a Diameter AAR message.

16. The method according to claim 13, wherein said packet switched network comprises an IP Multimedia Subsystem, and said application function is a Proxy Call Session Control Function.

* * * * *